United States Patent [19]

Murooka et al.

[11] Patent Number: 4,975,737
[45] Date of Patent: Dec. 4, 1990

[54] METHOD FOR REPRODUCING CORRECT IMAGES FROM INCORRECT EXPOSURE IMAGES

[75] Inventors: Takashi Murooka; Koji Takahashi, both of Kanagawa, Japan

[73] Assignee: Fuji Photo Film Co., Ltd., Kanagawa, Japan

[21] Appl. No.: 464,081

[22] Filed: Jan. 12, 1990

[30] Foreign Application Priority Data

Jan. 12, 1989 [JP] Japan .................................. 1-5281

[51] Int. Cl.$^5$ .............................................. G03B 27/32
[52] U.S. Cl. ...................................... 355/077; 355/35; 355/38
[58] Field of Search ...................... 355/32, 35, 38, 77, 355/88, 132

[56] References Cited

U.S. PATENT DOCUMENTS

| | | | |
|---|---|---|---|
| 4,335,956 | 6/1982 | Findeis et al. | 355/77 X |
| 4,344,704 | 8/1982 | Thurm et al. | 355/77 |
| 4,359,280 | 11/1982 | Krause | 355/77 |
| 4,406,538 | 9/1983 | Bühler | 355/77 X |
| 4,525,065 | 6/1985 | Takagi et al. | 355/77 |
| 4,526,462 | 7/1985 | Hope et al. | 355/77 X |
| 4,566,786 | 1/1986 | Fürsich et al. | 355/77 |
| 4,643,563 | 2/1987 | Sayanagi | 355/77 |
| 4,872,034 | 10/1989 | Ohta et al. | 355/77 |
| 4,884,102 | 11/1989 | Terashita | 355/77 |
| 4,929,978 | 5/1990 | Kanamori et al. | 355/38 |

FOREIGN PATENT DOCUMENTS

62-7290  1/1987  Japan .

Primary Examiner—Richard A. Wintercorn
Attorney, Agent, or Firm—Sughrue, Mion, Zinn, Macpeak & Seas

[57] ABSTRACT

For a color photosensitive material, a conversion table is created in order to convert three-color separation densities into Densities obtained by monochromatic Exposure (DME), and characteristic curves with respect to the DME's are created. The conversion table is used in order to convert three-color separation densities of respective picture elements of an incorrectly exposed image into DME's corresponding to the respective picture elements. The characteristic curves with respect to the DME's are used in order to convert the DME's corresponding to the respective picture elements of the incorrectly exposed image into DME's which correspond to a correctly exposed image. An image is then reproduced on the basis of the DME's which correspond to a correctly exposed image and which are thus found for the respective picture elements.

6 Claims, 12 Drawing Sheets

F I G. 6
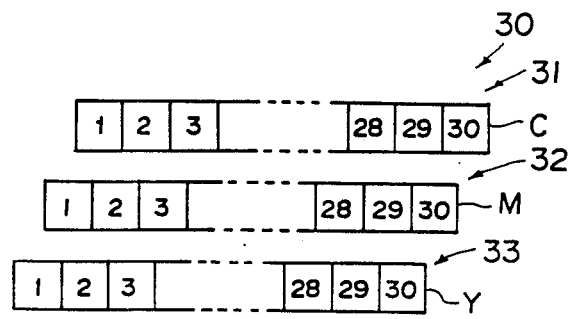
F I G. 7
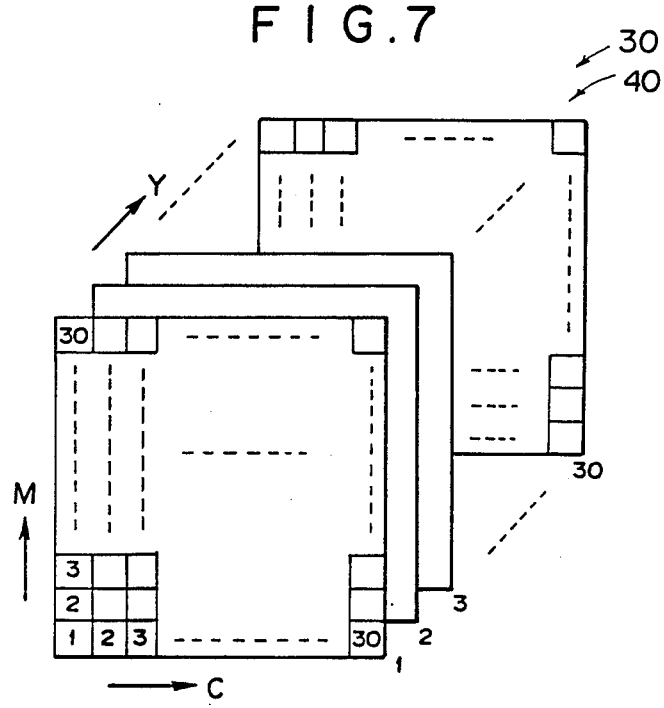

F I G. 10
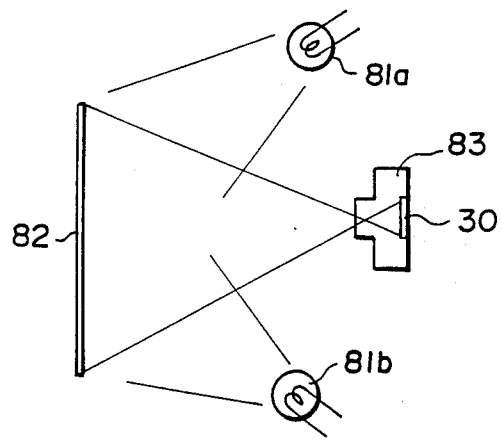
F I G. 11
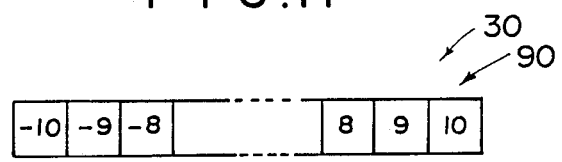

METHOD FOR REPRODUCING CORRECT IMAGES FROM INCORRECT EXPOSURE IMAGES

BACKGROUND OF THE INVENTION

1. Field of the Invention

This invention relates to a method for reproducing a high quality image from an image which was recorded with an incorrect exposure on a color photosensitive material.

2. Description of the Prior Art

There have heretofore been used systems wherein various images are recorded on a sheet of color photographic film accommodated in a camera and the color photographic film on which the images have been recorded is then subjected to development processing. Thereafter, in a printing apparatus, light is irradiated to the color photographic film, and light which has passed therethrough is irradiated to sheets of photographic paper on which images are reproduced.

In the aforesaid systems, it often occurs that, when an image is recorded on photographic film which is accommodated in a camera, the exposure set in the camera is unsuitable for the photographic film. Specifically, the photographic film is often exposed to an insufficient amount of light (this state is referred to as underexposure) or to an excessive amount of light (this state is referred to as over-exposure).

FIG. 1 is a graph showing some examples of characteristic curves of photographic film. In FIG. 1, the logarithmic value of the light amount E to which the photographic film was exposed (hereinafter referred to as log E) is plotted on the horizontal axis. Red, green, and blue spectral densities D, which are determined with a densitometer, are plotted on the vertical axis.

As illustrated in FIG. 1, the photographic film is designed so that, when it is irradiated with an exposure falling within the correct exposure range A, which approximately corresponds to the middle part of the log E axis, an image is formed which has good contrast and good color balance. When the photographic film is underexposed (i.e. when the exposure falls within the range B to the left side of the correct exposure range A) or is overexposed (i.e. when the exposure falls within the range C to the right side of the correct exposure range A), the gamma values which represent the degrees of inclination of the characteristic curves decrease. Also, the gamma values are not constant (i.e. the change of the spectral densities D with respect to log E becomes nonlinear), and the color balance changes. Therefore, in cases where an underexposed image or an overexposed image was recorded on the photographic film in a camera, even if the amount of light irradiated to photographic paper, a filter, or the like is adjusted in the course of printing the image on the photographic paper, a correct image cannot be reproduced on the photographic paper, and an image having undesirably soft gradation and bad color balance is obtained.

In order for a correct image to be reproduced from an incorrectly exposed image, the technique disclosed in, for example, Japanese Unexamined Patent Publication No. 62(1987)-7290 has been suggested. The disclosed technique comprises the steps of scanning an image, which has been recorded on photographic film, with a scanner or the like, in order to obtain three color signals which represent information about three colors and which comprise signal components representing respective picture elements of the image. Thereafter, the mean value, the maximum value, and the minimum value of each color signal are assigned as characteristic values. On the basis of the characteristic values, each color signal is corrected so that the gamma values thereof change. In this manner, the gradation of the image is corrected. When the gamma values are corrected with the disclosed technique and an image is reproduced on photographic paper with a laser printer or the like, a reproduced image having slightly better image quality will be obtained.

However, as described above, when the photographic film is underexposed or overexposed, the gamma values are not constant (i.e. the change of the spectral densities D with respect to log E becomes nonlinear). Therefore, with the disclosed technique, the gamma values cannot be corrected accurately. Also, the values of the three color signals, which are detected with the scanner, vary in accordance with the spectral characteristics of the optical filters used when the three color signals are being detected. Since a laser printer is used to reproduce an image on photographic paper and the characteristics of the optical filters are not associated with the characteristics of the laser printer, a correctly exposed image cannot be reproduced from an incorrectly exposed image with the disclosed technique.

SUMMARY OF THE INVENTION

The primary object of the present invention is to provide a method for reproducing a correctly exposed image from an incorrectly exposed image wherein an image having image quality approximately equivalent to the image quality, which would have been obtained if the exposure had been correct, is reproduced from an incorrectly exposed image which was formed when a color photosensitive material was underexposed or overexposed.

Another object of the present invention is to provide a method for reproducing a correctly exposed image from an incorrectly exposed image wherein an image having image quality approximately equivalent to the image quality, which would have been obtained if the exposure had been correct, is reproduced on a second color photosensitive material from an incorrectly exposed image which was formed when a color photosensitive material having characteristics different from the second color photosensitive material was underexposed or overexposed.

The present invention provides a method for reproducing a correctly exposed image from an incorrectly exposed image, which comprises the steps of:

(i) creating a conversion table, which assigns coordinates in a three-color separation density space to coordinates in a space of monochromatic exposure density (hereinafter simply referred to as "DME"), from an operation wherein:

(a) each of monochromatic light beams corresponding to hues, which will be formed in a color photosensitive material, is irradiated to said color photosensitive material, and the amount of light in each said monochromatic light beam irradiated to said color photosensitive material is changed to various values, whereby monochromatic samples, in which a dye corresponding to one of the hues has formed a color with various levels of densities, are prepared for each of the hues, (b) DME's of said monochromatic samples are determined, (c) said monochromatic light beams are simultaneously irradiated to a photosensitive material which has the same characteristics as said color photosensitive material, and the amount of light in said monochromatic light beams irradiated to said photosensitive material is changed to various values, thereby to prepare a plurality of standard color samples in which the dyes corresponding to the hues have formed colors with various levels of densities, and (d) three-color separation densities of said standard color samples are determined, (ii) creating characteristic curves of said color photosensitive material with respect to the DME's from an operation wherein:

(e) light having the same spectral intensity distribution is irradiated to a photosensitive material which has the same characteristics as said color photosensitive material, and the exposure is changed to various values in order to prepare a plurality of same-color samples, (f) three-color separation densities of said same-color samples are determined, and (g) said conversion table is used in order to convert the determined three-color separation densities into DME's, (iii) determining three-color separation densities of respective picture elements of an image which has been recorded on a photosensitive material which has the same characteristics as said color photosensitive material, (iv) using said conversion table in order to convert the determined three-color separation densities of the respective picture elements into DME's, (v) in cases where said image is an incorrectly exposed image resulting from an under-exposure or an over exposure, using said characteristic curves in order to convert the DME's corresponding to the respective picture elements into DME's which will correspond to a correctly exposed image, and (vi) reproducing an image on the basis of the DME's which correspond to the correctly exposed image and which are thus found for the respective picture elements.

The term "color photosensitive material" as used herein means one of various types of photosensitive materials, for example, color negative film which is ordinarily used in photography, color reversal film, and instant photographic film.

The term "hues which will be formed in a color photosensitive material" means the hues which will be formed from dyes in the color photosensitive material. For example, in the case of ordinary color negative film, this term means cyan, magenta, and yellow. (Cyan, magenta, and yellow will hereinafter be referred to respectively as C, M, and Y.)

By way of example, in cases where the color photosensitive material is color negative film, the term "monochromatic light beams corresponding to hues which will be formed in a color photosensitive material" as used herein means red, green, and blue laser beams which respectively cause colors to be fOrmed from dyes in a C forming layer, an M forming layer, and a Y forming layer of the color negative film. (Red, green, and blue will hereinafter be referred to respectively as R, G, and B.) However, each of the laser beams need not necessarily cause a color to be formed from only the dye in the corresponding one among the C forming layer, the M forming layer, and the Y forming layer. It is only necessary that each of the laser beams causes predominantly the corresponding one among the C forming layer, the M forming layer, and the Y forming layer to form a color. For example, when the G laser beam is irradiated to the color photosensitive material, the color should be predominantly formed in the M forming layer, but the colors may be slightly formed in the Y forming layer and the C forming layer. Also, each of the monochromatic light beams need not necessarily have a single wavelength as in the cases of laser beams, but may have a certain range of wavelengths insofar as the monochromatic light beam causes a color to be formed predominantly from the dye corresponding to one of the hues which will be formed in the color photosensitive material.

The term "monochromatic samples" as used herein means color samples in which a dye corresponding to one of the hues, which will be formed in the color photosensitive material, has predominantly formed a color. Each of the monochromatic samples need not necessarily have a density for only a specific narrow range of wavelengths. FIG. 2 is a graph showing examples of spectral density distributions of dyes formed in a C forming layer, an M forming layer, and a Y forming layer of photographic film. For example, as illustrated in FIG. 2, the bottom part of the curve representing the spectral density distribution of a dye formed in each color forming layer may extend over a wide range of wavelengths.

The term "DME's" as used herein means the densities of the monochromatic samples, which are determined with a densitometer, or the like, while an optical filter of the complementary color with respect to the color of the monochromatic samples is being inserted between the monochromatic samples and the densitometer or the like. For the C monochromatic samples, the term "DME's" means the R densities ($\overline{DR}$). For the M monochromatic samples, the term "DME's" means the G densities (DG). For the Y monochromatic samples, the term "DME's" means the B densities (DB). The nature of the R, G, and B, whose densities are determined from the monochromatic samples, has no relation to the nature of the R, G, and B of the monochromatic light beams. The nature of the R, G, and B, whose densities are determined from the monochromatic samples, depends on the spectral transmittance distributions (or the spectral reflectivity distributions) of the optical filters used in the densitometer, the spectral sensitivity distribution of the detector used in the densitometer, and the like. The DME's $\overline{DR}$, $\overline{DG}$, and $\overline{DB}$ may be the transmission densities or the reflection densities, depending on the nature of the color photosensitive material.

The term "standard color samples" as used herein embraces the color samples in which all dyes corresponding to the hues (for example, C, M, and Y), which will be formed in the color photosensitive material, have simultaneously formed colors, and the color samples in which the dye corresponding to only one of the hues (for example, only C) or dyes corresponding to some of the hues (for example, C and M) have formed colors.

In order for the three-color separation densities of each standard color sample to be determined, for example, the color of the standard color sample is separated into R, G, and B, and the densities DR, DG, and DB of the R, G, and B are determined with a color scanner or the like. The spectral transmittance distributions (or the spectral reflectivity distributions) of optical filters used in the color scanner, the spectral sensitivity distributions of detectors used in the color scanner, and the like, need not necessarily be identical with those in the densitometer which is used to determine the DME's $\overline{DR}$, $\overline{DG}$, and $\overline{DB}$ of the monochromatic samples. In cases where the spectral transmittance distributions (or the spectral reflectivity distributions) of the optical filters used in the color scanner, the spectral sensitivity distributions of detectors used in the color scanner, and the like, are different from those in the densitometer, different values are found for the R, G, and B densities of color samples having exactly the same spectral density distribution when they are determined with the densitometer and when they are determined with the color scanner. However, the monochromatic samples and the standard color samples are associated with each other with respect to information about the amount of light in the monochromatic light beams, and therefore the conversion table can be created accurately.

As in cases where the DME's $\overline{DR}$, $\overline{DG}$, and $\overline{DB}$ are determined with a densitometer, the three-color separation densities DR, DG, and DB determined with a color scanner or the like may be the transmission densities or the reflection densities, depending on the nature of the color photosensitive material.

The term "a plurality of same-color samples" as used herein means gray (achromatic color) samples or the like, which have different exposures. However, the same-color samples need not necessarily be of the achromatic color, but may be, for example, color samples in which the dyes have formed color in the aforesaid color photosensitive material.

In cases where an image, which has been recorded on a photosensitive material having the same characteristics as the aforesaid color photosensitive material, is an incorrectly exposed image resulting from an underexposure or an over-exposure, the characteristic curves with respect to the DME's are used in order to convert the DME's corresponding to the respective picture elements of the image into DME's which will correspond to a correctly exposed image. Thereafter, an image is reproduced on the basis of the DME's which will correspond to the correctly exposed image and which are thus found for the respective picture elements. When the image is reproduced, for example, the amount of light in the monochromatic light beams may be adjusted for each of the picture elements so that the DME's, which were found when the aforesaid conversion was carried out, are obtained on the aforesaid color photosensitive material. In this manner, the image may be reproduced on a photosensitive material which has the same characteristics as the photosensitive material which was underexposed or overexposed when the image was recorded thereon. Alternatively, after the image has been reproduced on the photosensitive material (for example, color negative film), it may be recorded again on a second photosensitive material (for example, photographic paper) with the aforesaid printing apparatus or the like. As another alternative, an image may be directly reproduced on a second photosensitive material (for example, photographic paper) with a laser printer or the like. This alternative can be accomplished by the method described below.

Specifically, the present invention also provides a method for reproducing a correctly exposed image from an incorrectly exposed image as defined above, wherein (1) a second conversion table, which assigns coordinates in a second three-color separation density space to coordinates in a second space of DME, is created from an operation wherein:

(A) each of second monochromatic light beams corresponding to hues, which will be formed in a second photosensitive material on which an image is to be reproduced from the image recorded on said photosensitive material having the same characteristics as said color photosensitive material, is irradiated to a photosensitive material having the same characteristics as said second photosensitive material, and the amount of light in each said second monochromatic light beam irradiated to said photosensitive material having the same characteristics as said second photosensitive material is changed to various values, whereby second monochromatic samples, in which a dye corresponding to one of the hues, which will be formed in said second photosensitive material, has formed a color with various levels of densities, are prepared for each of the hues, which will be formed in said second photosensitive material, (B) second DME's of said second monochromatic samples are determined, (C) said second monochromatic light beams are simultaneously irradiated to a photosensitive material which has the same characteristics as said second photosensitive material, and the amount of light in said second monochromatic light beams irradiated to said photosensitive material which has the same characteristics as said second photosensitive material is changed to various values, thereby to prepare a plurality of second standard color samples in which the dyes corresponding to the hues, which will be formed in said second photosensitive material, have formed colors with various levels of densities, and (D) second three-color separation densities of said second standard color samples are determined, (2) second characteristic curves of said second photosensitive material with respect to the DME's are created from an operation wherein:

(E) second light having the same spectral intensity distribution is irradiated to a photosensitive material which has the same characteristics as said second photosensitive material, and the exposure is changed to various values in order to prepare a plurality of second same-color samples, (F) second three-color separation densities of said second same-color samples are determined, and (G) said second conversion table is used in order to convert the second three-color separation densities into second DME's, (3) a third conversion table, which assigns said DME's of said monochromatic samples prepared with said color photosensitive material to printing densities, is created from an operation wherein:

(H) spectral distributions of a plurality of said standard color samples prepared with said photosensitive material, which has the same characteristics as said color photosensitive material, are found, and (I) for each of a plurality of said standard color samples prepared with said photosensitive material, which has the same characteristics as said color photosensitive material, printing densities Di are calculated from the formula $$Di = -\log \frac{\int P(\lambda)Si(\lambda)T(\lambda)d\lambda}{\int P(\lambda)Si(\lambda)d\lambda} \quad (1)$$

$$(i = B, G, R)$$

wherein $T(\lambda)$ represents the spectral distribution of each of said standard color samples, $P(\lambda)$ represents the spectral intensity distribution of said second light, $Si(\lambda)$ represents the spectral sensitivity distribution of said second photosensitive material, and $\lambda$ represents the wavelength of the light, (4) after the DME's which will correspond to the correctly exposed image are found for the respective picture elements, said third conversion table is used to convert said DME's of the respective picture elements into the printing densities of the respective picture elements, (5) said second characteristic curves with respect to the DME's are used to find the second DME's of the respective picture elements from said printing densities of the respective picture elements, and (6) said second monochromatic light beams are irradiated to positions on said second photosensitive material corresponding to the respective picture elements so that the amount of light in said second monochromatic light beams corresponds to the thus found second DME's of the respective picture elements, whereby the image is reproduced on said second photosensitive material.

The term "second photosensitive material" as used herein means one of various types of photosensitive materials as in the case of the aforesaid color photosensitive material. The second photosensitive material may have the same characteristics as the color photosensitive material. However, in such cases, the method for reproducing a correctly exposed image from an incorrectly exposed image wherein the second photosensitive material is used need not be employed. Therefore, it is intended that the second photosensitive material means a photosensitive material which is at least slightly different from the aforesaid color photosensitive material. For example, in cases where the color photosensitive material is photographic film, the second photosensitive material means photographic paper on which the image, which was recorded on the photographic film, is to be printed.

As in the case of the term "hues which will be formed in a color photosensitive material", the term "hues which will be formed in a second photosensitive material" as used herein means the hues which will be formed from dyes in the color photosensitive material.

As in the case of the term "monochromatic light beams corresponding to hues which will be formed in a color photosensitive material", the term "second monochromatic light beams corresponding to hues which will be formed in a second photosensitive material" as used herein means, for example, R, G, and B laser beams which respectively cause colors to be formed from dyes in a C forming layer, an M forming layer, and a Y forming layer of photographic paper. The second monochromatic light beams need not necessarily be the same as the monochromatic light beams corresponding to hues which will be formed in the color photosensitive material.

As in the case of the term "monochromatic samples", the term "second monochromatic samples" as used herein means color samples in which a dye corresponding to one of the hues, which will be formed in the second photosensitive material, has predominantly formed a color. In general, the spectral transmittance distributions (or the spectral reflectivity distributions) of the dyes in the second photosensitive material differ from those of the dyes in the color photosensitive material.

The term "second DME's" as used herein means the R, G, and B densities ($\overline{DR'}$, $\overline{DG'}$, and $\overline{DB'}$) of the second monochromatic samples, which are determined with a densitometer, or the like. The densitometer used to determine the second DME's $\overline{DR'}$, $\overline{DG'}$, and $\overline{DB'}$ need not necessarily be the same as the densitometer used to determine the DME's $\overline{DR}$, $\overline{DG}$, and $\overline{DB}$ of the monochromatic samples prepared with the color photosensitive material. The second DME's $\overline{DR'}$, $\overline{DG'}$, and $\overline{DB'}$ may be the transmission densities or the reflection densities, depending on the nature of the second photosensitive material.

As in the case of the term "standard color samples", the term "second standard color samples" as used herein embraces the color samples in which all dyes corresponding to the hues (for example, C, M, and Y), which will be formed in the second photosensitive material, have simultaneously formed colors, and the color samples in which the dye corresponding to only one of the hues (for example, only C) or dyes corresponding to some of the hues (for example, C and M) have formed colors.

As in the case of the aforesaid three-color separation densities of each standard color sample, in order for the second three-color separation densities of each second standard color sample to be determined, for example, the color of the second standard color sample is separated into R, G, and B, and densities DR', DG', and DB' of R, G, and B are determined with a color scanner or the like. The spectral transmittance distributions (or the spectral reflectivity distributions) of optical filters used in the color scanner, the spectral sensitivity distributions of detectors used in the color scanner, and the like, need not necessarily be identical with those in the densitometer which is used to determine the second DME's $\overline{DR'}$, $\overline{DG'}$, and $\overline{DB'}$ of the second monochromatic samples, and those in the densitometer which is used to determine the DME's $\overline{DR}$, $\overline{DG}$, and $\overline{DB}$ of the monochromatic samples. Also, the spectral transmittance distributions (or the spectral reflectivity distributions) of optical filters used in the color scanner, the spectral sensitivity distributions of detectors used in the color scanner, and the like, need not necessarily be identical with those in the color scanner which is used to determine the three-color separation densities DR, DG, and DB of the standard color samples prepared with the photosensitive material having the same characteristics as the color photosensitive material. The second monochromatic samples and the second standard color samples are associated with each other with respect to information about the amount of light in the second monochromatic light beams, and therefore the second conversion table can be created accurately. As in the case of the second DME's $\overline{DR'}$, $\overline{DG'}$, and $\overline{DB'}$, the second three-color separation densities DR', DG', and DB' may be the transmission densities or the reflection densities, depending on the nature of the second photosensitive material.

As in the case of the term "a plurality of same-color samples", the term "a plurality of second same-color samples" as used herein means gray (achromatic color) samples or the like, which are different in exposure from one another. However, the second same-color samples need not necessarily be of the achromatic color, but may be, for example, color samples in which the dyes have formed color in the second photosensitive material.

The term "spectral distributions of a plurality of standard color samples formed on a photosensitive material, which has the same characteristics as the color photosensitive material" as used herein means the spectral transmittance distributions or the spectral reflectivity distributions of the standard color sample, which are determined by the nature of the photosensitive material which has the same characteristics as the color photosensitive material. For example, in cases where the photosensitive material, which has the same characteristics as the color photosensitive material and which is used to prepare the standard color samples, is ordinary color negative film, the spectral distributions of the standard color samples are the spectral transmittance distributions. In cases where said photosensitive material is ordinary instant photographic film, the spectral distributions of the standard color samples are the spectral reflectivity distributions.

Effects of the method for reproducing a correctly exposed image from an incorrectly exposed image in accordance with the present invention will be described hereinbelow.

As described above, in order to reproduce a correctly exposed image from an image which was underexposed or overexposed when it was recorded, a technique in which gamma values are corrected is disclosed in, for example, Japanese Unexamined Patent Publication No. 62(1987)-7290. A technique will also be considered wherein, instead of the concept of "DME's" being used, three-color separation densities of same-color samples are determined, and characteristic curves with respect to the three-color separation densities are created. The characteristic curves with respect to the three-color separation densities are used to convert the three-color separation densities of the respective picture elements of an incorrectly exposed image into the three-color separation densities corresponding to a correctly exposed image. Thereafter, an investigation is made to find which of the standard color samples corresponds to the three-color separation densities corresponding to the correctly exposed image. (In cases where no standard color sample is found whose three-color separation densities coincide with the three-color separation densities corresponding to the correctly exposed image, such a standard color sample is found through interpolation, the three-color separation densities of neighboring standard color samples being used therefor. In the course of reproducing an image, the amount of light in the monochromatic light beams is adjusted so that the three-color separation densities corresponding to a correctly exposed image are realized.

However, a dye corresponding to a hue, which will be formed in each color forming layer of the color photosensitive material, affects the dyes formed in the adjacent color forming layers of the color photosensitive material. The extent of the effect varies depending on the extent to which the dyes form colors. Therefore, the extent of the effect differs among the standard color samples. Also, the extent to which the dyes affect one another in the same-color samples varies in accordance with, for example, the color temperature (i.e. the spectral intensity distribution) of light which was irradiated in the course of preparing the same-color samples. Accordingly, the characteristic curves with respect to the three-color separation densities, which are obtained from the same-color samples, differ from correct ones.

FIG. 3 is a graph showing R characteristic curves, which are examples of characteristic curves with respect to three-color separation densities and which were obtained from two sets of same-color samples prepared with two types of light differing in color temperature. Because the two sets of same-color samples were prepared with two types of light differing in color temperature, the extent to which the dyes affected one another differs in the two sets of the same-color samples. Therefore, even though the same densitometer is used to determine the R densities of the two sets of the same-color samples, R characteristic curves 1 and 2 differ as illustrated. The case will be considered hereinbelow where an image recorded with an exposure, which was insufficient by a width F along the log E axis, is to be corrected. In cases where the R density (one of the three-color separation densities) of a certain picture element of this image is DR1, when the characteristic curve 1 is used, the R density DR1 is converted into a density DR2, i.e. it is regarded that the R density would have been equal to DR2 if the exposure had been correct. When the characteristic curve 2 is used, the R density DR1 is converted into a density DR3.

Therefore, with the aforesaid technique, after they have been corrected, the densities vary in accordance with the characteristic curves used to effect the correction. Accordingly, the densities cannot be corrected accurately, and it is not possible to obtain a reproduced image which has good image quality and whose gradation and color balance have been corrected accurately.

FIG. 4 is a graph showing R characteristic curves, which are examples of characteristic curves with respect to DME's and which were obtained from an operation wherein two sets of same-color samples were prepared with two types of light differing in color temperature, and three-color separation densities DR, DG, and DB were determined from the two sets of same-color samples and converted into DME's $\overline{DR}$, $\overline{DG}$, and $\overline{DB}$ in accordance with a conversion table.

The shapes of the characteristic curves with respect to the DME's are inherent to the photosensitive material used to prepare the characteristic curves. Therefore, even if two sets of same-color samples are prepared with two types of light differing in color temperature, when the three-color separation densities DR, DG, and DB determined from the two sets of same-color samples are converted into the DME's $\overline{DR}$, $\overline{DG}$, and $\overline{DB}$ in accordance with the conversion table, and the characteristic curves with respect to DME's are created, the shapes of the characteristic curves 1' and 2' thus created coincide with each other as illustrated in FIG. 4. (However, the characteristic curves 1' and 2' can deviate in position from each other along the log E axis, while their shapes are kept the same.)

When the characteristic curve 1' or 2' is used, the densities can be corrected accurately. Specifically, the three-color separation densities DR, DG, and DB of respective picture elements of an image, which has been underexposed or overexposed, are determined. The conversion table is used in order to convert the three-color separation densities DR, DG, and DB of the respective picture elements into the DME's $\overline{DR}$, $\overline{DG}$, and $\overline{DB}$. As illustrated in FIG. 4, the DME's thus obtained (for example, $\overline{DR1}$ shown in FIG. 4) are converted into DME's (for example, $\overline{DR2}$ shown in FIG. 4) which will correspond to a correctly exposed image. In this manner, the DME's are converted into the densities which accurately coincide with the correctly exposed image. The relationship between the DME's and the amount of light in the monochromatic light beams is already known from the steps in which the monochromatic samples and the standard color samples were prepared. Therefore, in the course of reproducing an image, the amount of light in the monochromatic light beams irradiated to a photosensitive material, which has the same characteristics as the aforesaid color photosensitive material, is adjusted for each position on the photosensitive material corresponding to each picture element so that the DME's corresponding to the correct exposure for the image are realized. In this manner, an image which coincides very well with a correctly exposed image is reproduced on the photosensitive material.

In cases where an image is to be reproduced on the second photosensitive material (for example, photographic paper), any of known methods may be employed. For example, a method may be employed wherein, after the image has been reproduced on the photosensitive material (for example, color negative film) which has the same characteristics as the color photosensitive material, the image is printed on a second photosensitive material with a printing apparatus. Alternatively, an image may be directly reproduced on the second photosensitive material (for example, photographic paper) with the method described above.

Specifically, in the same manner as that for the color photosensitive material, the second conversion table is created for the second photosensitive material, which table assigns coordinates in the second three-color separation density space to coordinates in the second space of DME. Thereafter, the second characteristic curves of the second photosensitive material with respect to the DME's are created. Also, in order for the color photosensitive material to be associated with the second photosensitive material, printing densities Di (where i=R, G, B) of a plurality of the standard color samples prepared with the photosensitive material, which has the same characteristics as the color photosensitive material, are calculated from Formula (1). Thereafter, the third conversion table is created which assigns the DME's of the monochromatic samples prepared with the color photosensitive material to the printing densities. The printing densities correspond to the log E axis of the graph of the second characteristic curves of the second photosensitive material with respect to the DME's. Therefore, an image having very good image quality can be reproduced on the second photosensitive material.

The image is reproduced on the second photosensitive material in the manner described below. Specifically, with the aforesaid method for reproducing a correctly exposed image from an incorrectly exposed image in accordance with the present invention, the DME's which correspond to the correctly exposed image are found for the respective picture elements. Thereafter, the third conversion table is used to convert the DME's of the respective picture elements, which correspond to the correctly exposed image, into the printing densities of the respective picture elements. The second characteristic curves with respect to the DME's are then used to find the second DME's of the respective picture elements from the printing densities of the respective picture elements. The second monochromatic light beams are irradiated to positions on the second photosensitive material, which positions correspond to the respective picture elements, so that the amount of light in the second monochromatic light beams corresponds to the thus found second DME's of the respective picture elements. In this manner, the image can be reproduced on the second photosensitive material.

As described above, with the method for reproducing a correctly exposed image from an incorrectly exposed image in accordance with the present invention, the conversion table is created for the color photosensitive material in order to convert the three-color separation densities into the DME's. Also, the characteristic curves of the color photosensitive material with respect to the DME's are created. The conversion table is used in order to convert the three-color separation densities of respective picture elements of an incorrectly exposed image into the DME's corresponding to the respective picture elements. Thereafter, the characteristic curves with respect to the DME's are used in order to convert the DME's corresponding to the respective picture elements into the DME's which will correspond to a correctly exposed image. An image is then reproduced on the basis of the DME's which correspond to a correctly exposed image and which are thus found for the respective picture elements. Therefore, it is possible to reproduce an image having a gradation and color balance, or the like, which coincide very well with those of a correctly exposed image.

In cases where an image is to be reproduced on a second photosensitive material which is different in characteristics from the color photosensitive material, the second characteristic curves of the second photosensitive material with respect to the DME's are created. Also, the third conversion table is created in order to convert the DME's of the monochromatic samples prepared with the color photosensitive material into the printing densities. After the DME's which correspond to the correctly exposed image are found for the respective picture elements in the manner described above, the third conversion table is used to convert the DME's, which correspond to the correctly exposed image and which are thus found for the respective picture elements, into the printing densities of the respective picture elements. Thereafter, the second characteristic curves with respect to the DME's are used to find the second DME's of the respective picture elements from the printing densities of the respective picture elements. Based on the thus found second DME's of the respective picture elements, an image is reproduced on the second photosensitive material. Therefore, an image which corresponds to a correctly exposed image can be reproduced accurately on the second photosensitive material, which has different characteristics from the color photosensitive material.

BRIEF DESCRIPTION OF THE DRAWINGS

FIG. 6 is a schematic view showing examples of monochromatic samples prepared with color negative film, FIG. 7 is a schematic view showing examples of a plurality of standard color samples prepared with color negative film, FIG. 10 is a schematic view showing an example of how a camera and screen can be configured to allow color negative film to be exposed in a step-wise fashion, FIG. 11 is a schematic view showing examples of same-color samples, which were prepared with color negative film while the exposure was changed to various values with the configuration of FIG. 10.

DESCRIPTION OF THE PREFERRED EMBODIMENTS

The present invention will hereinbelow be described in further detail with reference to the accompanying drawings.

Figure 5:
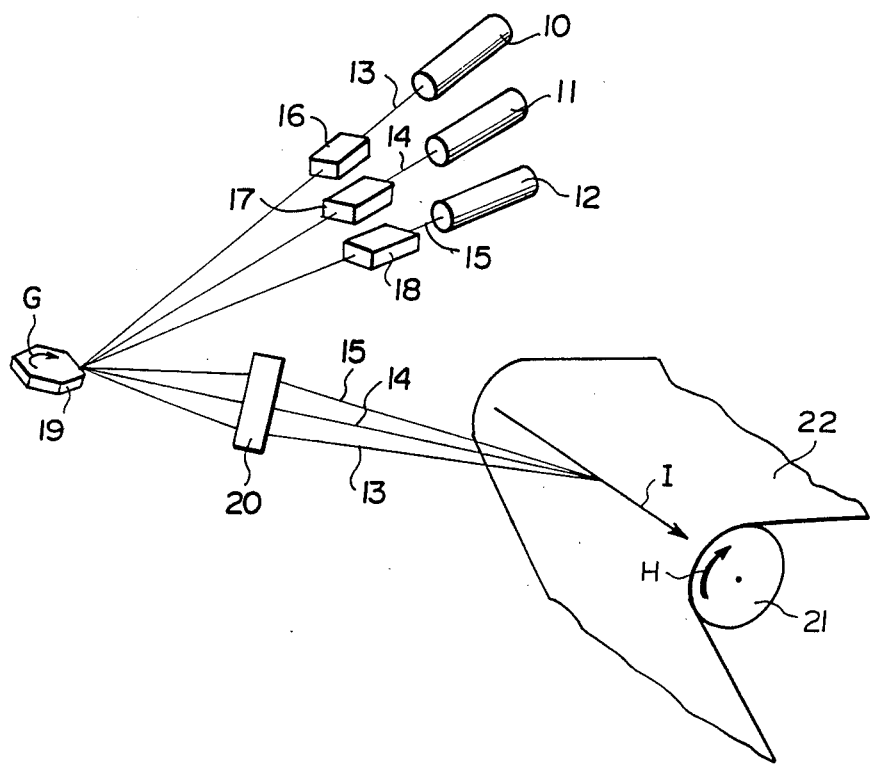
FIG. 5 is a perspective view showing an example of a color laser printer.

FIG. 5 is a perspective view showing an example of a color laser printer. (The color laser printer will hereinafter be simply referred to as a printer.)

With reference to FIG. 5, laser beam sources 10, 11, and 12 respectively produce laser beams 13, 14, and 15 which serve as R, G, and B monochromatic light beams. The laser beams 13, 14, and 15 pass through acousto-optic modulators 16, 17, and 18, which independently modulate the intensities of the laser beams 13, 14, and 15. (The acousto-optic modulators will hereinafter be referred to as AOM's.) The laser beams 13, 14, and 15, which have been radiated from the AOM's 16, 17, and 18, impinge upon a rotating polygon mirror 19, which is rotated quickly in the direction indicated by the arrow G. The laser beams 13, 14, and 15 are reflected and deflected by the rotating polygon mirror 19, pass through a converging lens system 20, and are then caused to scan a film-shaped photosensitive material 22 quickly and repeatedly in the direction indicated by the arrow I while the photosensitive material 22 is being moved by a rotatable drum 21, which rotates in the direction indicated by the arrow H. The intensities of the laser beams 13, 14, and 15 are modulated in synchronization with the speed at which the rotating polygon mirror 19 rotates and the speed at which the drum 21 rotates. In this manner, a desired image is recorded on the photosensitive material 22.

FIG. 6 shows monochromatic sample sheets 31, 32, and 33 prepared with color negative film 30. In the examples shown, each of the monochromatic sample sheets 31, 32, and 33 comprises thirty monochromatic samples which are indicated by the numbers 1 to 30 enclosed in square frames.

Figure 1:
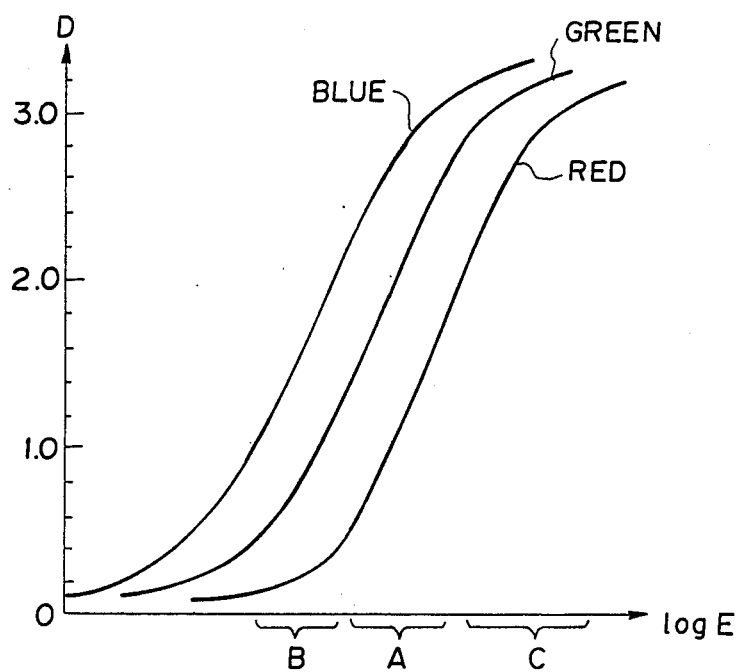
FIG. 1 is a graph showing examples of characteristic curves of photographic film.
Figure 2:
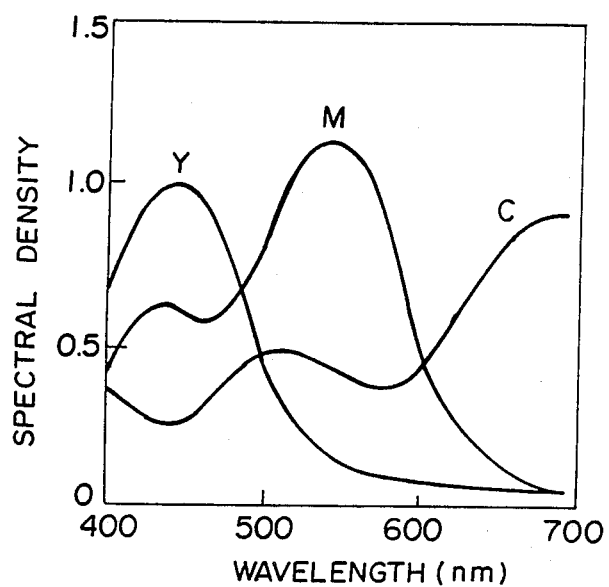
FIG. 2 is a graph showing examples of spectral density distributions of dyes formed in a C forming layer, an M forming layer, and a Y forming layer of photographic film.
Figure 3:
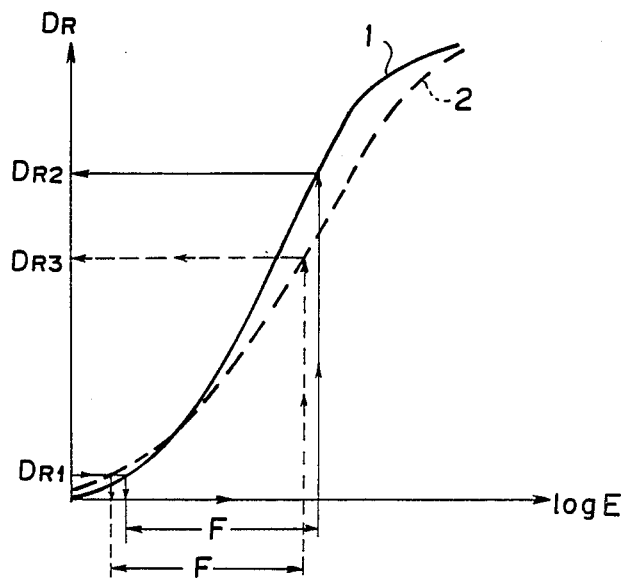
FIG. 3 is a graph showing R characteristic curves, which are examples of characteristic curves with respect to three-color separation densities and which were obtained from two sets of same-color samples prepared with two types of light differing in color temperature from each other.
Figure 4:
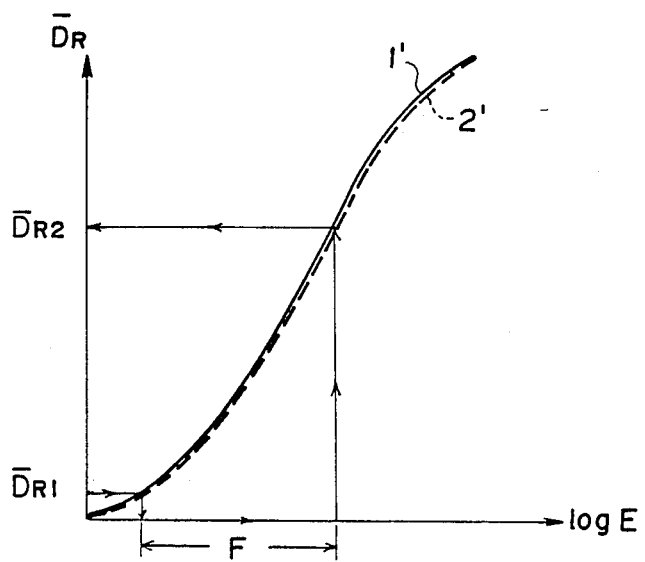
FIG. 4 is a graph showing R characteristic curves, which are examples of characteristic curves with respect to DME's and which were obtained from an operation wherein two sets of same-color samples were prepared with two types of light differing in color temperature from each other and three-color separation densities DR, DG, and DB were determined from the two sets of same-color samples and converted into DME's $\overline{DR}$, $\overline{DG}$, and $\overline{DB}$ in accordance with a conversion table.

When the monochromatic sample sheets 31, 32, and 33 are prepared, the color negative film 30, which serves as a color photosensitive material, is set as the photosensitive material 22 in the printer shown in FIG. 5. (The color negative film 30 will hereinafter be referred to as the film 30.) The laser beam sources 10, 11, and 12 are activated independently, the intensities of the laser beams 13, 14, and 15 are modulated, and the modulated laser beams are independently irradiated to sheets of the film 30. Specifically, when the monochromatic sample sheet 31 is prepared, the R laser beam 13 alone is irradiated to a sheet of the film 30, and the intensity of the R laser beam 13 is modulated by the AOM 16 so that the exposure varies among the monochromatic sample Nos. 1 to 30. When the monochromatic sample sheet 32 is prepared, the G laser beam 14 alone is irradiated to a sheet of the film 30, and the intensity of the G laser beam 14 is modulated by the AOM 17 so that the exposure varies among the monochromatic sample Nos. 1 to 30. When the monochromatic sample sheet 33 is prepared, the B laser beam 15 alone is irradiated to a sheet of the film 30, and the intensity of the B laser beam 15 is modulated by the AOM 18 so that the exposure varies among the monochromatic sample Nos. 1 to 30. When being exposed to the R laser beam 13, the G laser beam 14, and the B laser beam 15, respectively, the film 30 forms C, M, and Y hues. The dyes corresponding to the C, M, and Y hues formed in the film 30, which is used to prepare the monochromatic sample sheets 31, 32, and 33, exhibit the spectral transmittance distributions shown in FIG. 2. For example, for the dye corresponding to the M hue, the curve representing the spectral transmittance distribution extends over a wide range of 400 nm to 700 nm.

FIG. 7 shows a plurality of standard color sample sheets 40, 40, . . . prepared with film 30, which has the same characteristics as the film 30 used to prepare the monochromatic sample sheets 31, 32, and 33. The printer shown in FIG. 5 is used for this purpose, and the R laser beam 13, the G laser beam 14, and the B laser beam 15 are simultaneously irradiated to the film 30.

Specifically, thirty sheets of the film 30 are used to prepare the thirty standard color sample sheets 40, 40, . . . . The amount of light in the B laser beam 15 irradiated to each sheet of the film 30 is controlled so that the Y density varies step-wise among the thirty sheets of the film 30. Also, the amount of light in the R laser beam 13 and the G laser beam 14 irradiated to each sheet of the film 30 is controlled so that the C density varies in thirty steps along the horizontal direction (i.e. along the direction indicated by the arrow C) on each sheet of the film 30, and the M density varies in thirty steps along the vertical direction (i.e. along the direction indicated by the arrow M) on each sheet of the film 30. In this manner, the thirty standard color sample sheets 40, 40, . . . comprising 27,000 (i.e. 30×30×30=27,000) standard color samples are prepared. The amount of light in the R laser beam 13, the G laser beam 14, and the B laser beam 15 is controlled so that, if the hues were not affected, the colors of the standard color samples would be located at equal intervals in the CMY color space. However, actually, the C, M, and Y hues formed in the color forming layers of the film 30 affect one another in a very complicated manner. For example, a dye formed in a certain color forming layer of the film 30 will restrain colors from forming in the other color forming layers of the film 30. Therefore, the colors of the standard color samples are located at different intervals in the CMY color space. However, this is a conceptual matter, and it is not necessary to determine how the colors of the standard color samples are located.

In this embodiment, in the standard color samples formed on the standard color sample sheets 40, 40, . . . , the C, M, and Y densities are respectively changed in thirty steps along the directions indicated by the arrows C, M and Y. This is a mere example, and the C, M, and Y densities may be respectively changed in an arbitrary number of steps (in n1 number of steps, in n2 number of steps, and in n3 number of steps) along the directions indicated by the arrows C, M and Y. The number of steps may be determined on the basis of the accuracy with which colors are to be reproduced ultimately, the speed with which the necessary calculations must be carried out, and the like. Also, the number of steps in which the densities of the monochromatic samples formed on the monochromatic sample sheets 31, 32, and 33 shown in FIG. 6 are changed need not necessarily be thirty, and need not necessarily be equal to the the number of steps with which the C, M, and Y densities are changed.

Figure 8:
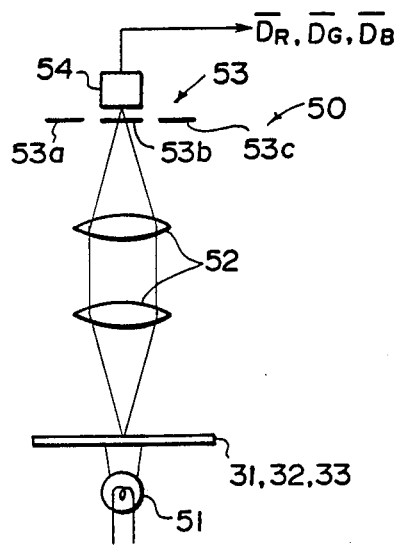
FIG. 8 is a schematic view showing an example of a densitometer used to determine the R, G, and B transmission densities (i.e. DME's $\overline{DR}$, $\overline{DG}$, and $\overline{DB}$) of the monochromatic samples shown in FIG. 6.

FIG. 8 is a schematic view showing an example of a densitometer used to determine the R, G, and B transmission densities (i.e. DME's $\overline{DR}$, $\overline{DG}$, and $\overline{DB}$) of the monochromatic samples formed on the monochromatic sample sheets 31, 32, and 33 shown in FIG. 6.

With reference to FIG. 8, a densitometer 50 determines the transmission densities of the monochromatic samples. Each of the monochromatic samples formed on the monochromatic sample sheets 31, 32, and 33 is located above a light source 51 which produces white light. The white light is irradiated to each monochromatic sample and passes therethrough. The white light which has passed through each monochromatic sample passes through a lens system 52 and a color filter 53, and is detected by a photodetector 54. As the color filter 53, one of color filters 53a, 53b, and 53c which respectively transmits only R light, G light, and B light is used selectively. Specifically, the color filter 53a (which transmits only R light) is used for each of the C monochromatic samples (Nos. 1 to 30 enclosed in the square frames in FIG. 6) formed on the monochromatic sample sheet 31. The color filter 53b (which transmits only G light) is used for each of the M monochromatic samples (Nos. 1 to 30 enclosed in the square frames in FIG. 6) formed on the monochromatic sample sheet 32. Also, the color filter 53c (which transmits only B light) is used for each of the Y monochromatic samples (Nos. 1 to 30 enclosed in the square frames in FIG. 6) formed on the monochromatic sample sheet 33. In this manner, the DME's $\overline{DR}$, $\overline{DG}$, and $\overline{DB}$ of the monochromatic samples formed on the monochromatic sample sheets 31, 32, and 33 are determined.

Actually, as is well known, in order to compensate for the color temperature of the white light produced by the light source 51 and to determine the densities more accurately, the amount of light in the R, G, and B light components of the white light before it passes through each of the monochromatic samples formed on the monochromatic sample sheets 31, 32, and 33 may be determined. Based on the amount of light in the R, G, and B light components, the R, G, and B densities determined from the light which has passed through each monochromatic sample may be corrected.

The values of the DME's $\overline{DR}$, $\overline{DG}$, and $\overline{DB}$ determined in this manner depend on the colors formed with the dyes in the monochromatic sample sheets 31, 32, and 33, and are affected by the spectral transmittance distributions of the color filters 53a, 53b, and 53c, the spectral sensitivity distribution of the photodetector 54, and the like. The nature of the R, G, and B, whose densities are determined from the monochromatic samples, has no relation to the nature of the R, G, and B of the laser beams 13, 14, and 15 which were used when the monochromatic sample sheets 31, 32, and 33 were prepared.

Figure 9:
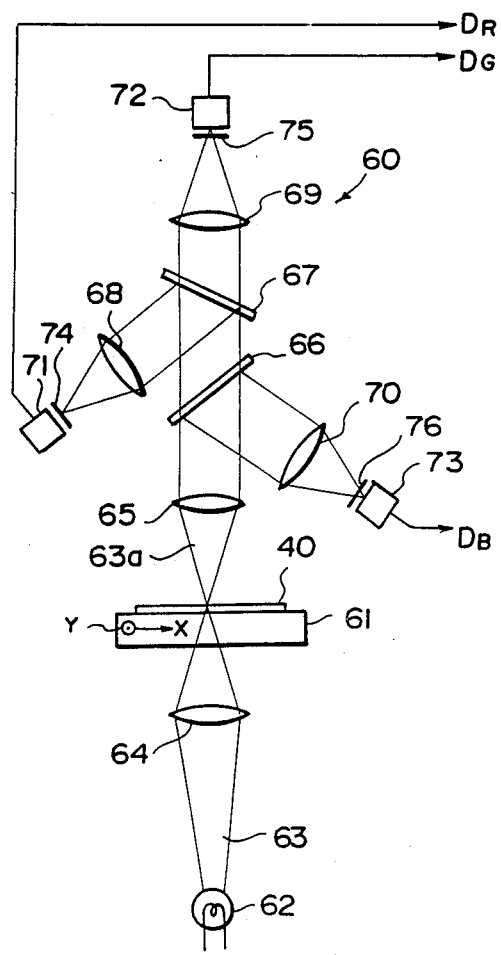
FIG. 9 is a schematic view showing an example of a scanner used to determine the transmission densities (i.e. three-color separation densities DR, DG, and DB) of the standard color samples shown in FIG. 7.

FIG. 9 is a schematic view showing an example of a scanner used to determine the transmission densities of each of the standard color samples formed on the standard color sample sheets 40, 40, . . . shown in FIG. 7. The term "scanner" as used herein means one type of densitometer which is capable of determining the density of each picture element of the image recorded on the film 30 or the like.

With reference to FIG. 9, the standard color sample sheets 40, 40, . . . shown in FIG. 7 are located one after another on a supporting base 61 of a scanner 60. The supporting base 61 can move in the direction indicated by the arrow X and in the direction indicated at Y, which is normal to the X direction. After a standard color sample sheet 40 is located on the supporting base 61, white light 63 produced by a lamp 62 is condensed by a lens 64 and is then irradiated to one of the standard color samples formed on the standard color sample sheet 40. The supporting base 61 is designed so that it does not intercept the white light 63. Light 63a which has passed through the standard color sample carries information about the C, M, and Y color densities of the standard color sample. The light 63a is collimated by a lens 65 and divided by dichroic mirrors 66 and 67 into three light beams. The three light beams are respectively condensed by lenses 68, 69, and 70, and then pass through an R color filter 74, a G color filter 75, and a B color filter 76. The amount of the R light, the G light, and the B light, which has passed through the color filters, is respectively detected by photodetectors 71, 72, and 73. In this manner, the R, G, and B densities of the measured point of the standard color sample are determined. The supporting base 61 is moved in the X and Y directions, and the R, G, and B densities of all of the standard color samples formed on the standard color sample sheet 40, which is located on the supporting base 61, are determined. Thereafter, a next standard color sample sheet 40 is located on the supporting base 61, and the R, G, and B densities of all of the standard color samples formed on the standard color sample sheet 40 are determined. This operation is repeated until the R, G, and B transmission densities of the 27,000 standard color samples shown in FIG. 7 are determined. These R, G, and B transmission densities are referred to as the three-color separation densities DR, DG, and DB. Actually, as in the case of the densitometer 50 shown in FIG. 8, the color temperature of the white light 63 may be compensated for.

The density values determined with the scanner 60 are affected by the characteristics of the dichroic mirrors 66 and 67, the color filters 74, 75, and 76, and the photodetectors 71, 72, and 73. Therefore, if the densities of the monochromatic samples formed on the monochromatic sample sheets 31, 32, and 33 are determined with the scanner 61, the same values as the values determined with the densitometer 50 shown in FIG. 8 will not always be obtained. However, the monochromatic samples formed on the monochromatic sample sheets 31, 32, and 33 and the standard color samples formed on the standard color sample sheets 40, 40, . . . were prepared with the same laser printer shown in FIG. 5. Therefore, the monochromatic samples and the standard color samples are associated with each other with respect to information about the amount of light in the R laser beam 13, the G laser beam 14, and the B laser beam 15 (or the voltages applied to the AOM's 16, 17, and 18), which were controlled in the laser printer. Accordingly, on the basis of the densities determined in the manner described above, a conversion table can be created which assigns coordinates (DR, DG, DB) in the three color separation density space to coordinates ($\overline{DR}$, $\overline{DG}$, $\overline{DB}$) in the space of DME. Because various nonlinear factors are present as described above, the conversion between the coordinates (DR, DG, DB) and the coordinates ($\overline{DR}$, $\overline{DG}$, $\overline{DB}$) in the two density spaces is a nonlinear conversion.

The DME's $\overline{DR}$, $\overline{DG}$, and $\overline{DB}$ of the monochromatic samples formed on the monochromatic sample sheets 31, 32, and 33 were determined with the densitometer 50 shown in FIG. 8 instead of the scanner 60 shown in FIG. 9. This means that the same scanner 60, or the like, as that used to determine the three-color separation densities DR, DG, and DB of the standard color samples formed on the standard color sample sheets 40, 40, . . . need not necessarily be used to determine the DME's $\overline{DR}$, $\overline{DG}$, and $\overline{DB}$ of the monochromatic samples formed on the monochromatic sample sheets 31, 32, and 33. Of course, the DME's $\overline{DR}$, $\overline{DG}$, and $\overline{DB}$ of the monochromatic samples formed on the monochromatic sample sheets 31, 32, and 33 may be determined with the scanner 60 shown in FIG. 9 instead of with the densitometer 50 shown in FIG. 8.

Thereafter, characteristic curves with respect to the DME's (i.e. the curves which represent the DME's with respect to the logarithmic values log E of the exposure E) of the film 30, which was used to prepare the monochromatic sample sheets 31, 32, and 33 and the standard color sample sheets 40, 40, . . . , are created in the manner described below.

FIG. 10 is a schematic view showing an example of how a camera and screen can be configured to allow the film 30 to be exposed in a step-wise fashion.

With reference to FIG. 10, a gray screen 82 is uniformly exposed to light produced by lamps 81a and 81b. The gray screen 82 is photographed with a camera 83 in which the film 30 is accommodated. As various photographs are taken, the aperture of the camera 83 is set to various values so that the respective frames of the film 30 are exposed with different exposures. The film 30 in the camera 83 has the same characteristics as those of the film 30 which was used to prepare the monochromatic sample sheets 31, 32, and 33 and the standard color sample sheets 40, 40, . . . . After images of the gray screen 82 are recorded with different exposures on the respective frames of the film 30, the film 30 is developed under the same conditions as the standard color samples on the standard color sample sheets 40, 40, . . . .

FIG. 11 is a schematic view showing examples of the same-color samples prepared (on a same-color sample sheet 90) with the film 30 while the exposure was changed to various values in the manner described above.

With reference to FIG. 11, the numerals $-10$ to 10 indicated in the square frames represent how the exposures were set for the same-color samples. For example, if a same-color sample which was obtained with a standard exposure is represented by 0, then the numeral $-10$ represents a same-color sample whose exposure is 10 steps lower than the standard exposure. The numeral 10 represents a same-color sample whose exposure is 10 steps higher than the standard exposure. The exposure levels of the same-color samples need not necessarily range from $-10$ to 10. Also, additional same-color samples may be prepared whose exposures fall between the exposure levels shown in FIG. 11. The number of exposure levels may be selected in accordance with the desired accuracy or the like.

Figure 13:
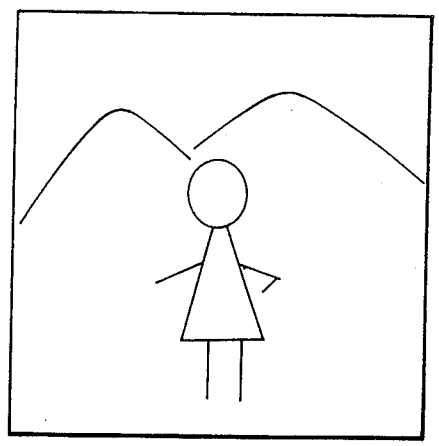
FIG. 13 is a schematic view showing an example of an underexposed image.

In this embodiment, the camera 83 is used to prepare same-color samples whose exposures vary on the same-color sample sheet 90. The same-color samples thus prepared are affected by attributes of the camera, such as flare. Therefore, in cases where an underexposed image, as will be described later with reference to FIG. 13, is recorded with a camera, the color densities of the image can be corrected so that they correspond to the correctly exposed image, which would have been obtained with the camera, without any compensation having to be made for the attributes of the camera which affected the image. However, in order to prepare the same-color samples on the same-color sample sheet 90, means other than a camera may be used. For example, as will be described later with reference to FIG. 18, a step wedge 87 may be used to prepare the same-color samples. In cases where a step wedge 87 is used and an underexposed or overexposed image, whose densities are to be corrected, was recorded with a camera, the attributes of the camera which affected the image, such as flare, should preferably be taken into consideration in the course of correcting the densities of the underexposed or overexposed image.

Three-color separation densities DR, DG, and DB of each of the same-color samples formed on the same-color sample sheet 90 are determined with the scanner 60 (shown in FIG. 9) which was used to determine the three-color separation densities DR, DG, and DB of each of the standard color samples formed on the standard color sample sheets 40, 40, . . . . In this embodiment, the same scanner 60 that was used to determine the three-color separation densities DR, DG, and DB of each of the standard color samples is also used to determine the three-color separation densities DR, DG, and DB of each of the same-color samples formed on the same-color sample sheet 90. However, in order to determine the three-color separation densities DR, DG, and DB of each of the same-color samples formed on the same-color sample sheet 90, other scanners may be used insofar as they have the same characteristics as the the scanner 60 used to determine the three-color separation densities DR, DG, and DB of each of the standard color samples. For the sake of simplicity, scanners having the same characteristics as each other are referred to as the same scanner. Thereafter, the conversion table, which assigns coordinates (DR, DG, DB) in the three color separation density space to coordinates ($\overline{DR}, \overline{DG}, \overline{DB}$) in the space of DME, is used to convert the three-color separation densities DR, DG, and DB of the same-color samples formed on the same-color sample sheet 90 into DME's $\overline{DR}, \overline{DG},$ and $\overline{DB}$.

Figure 12:
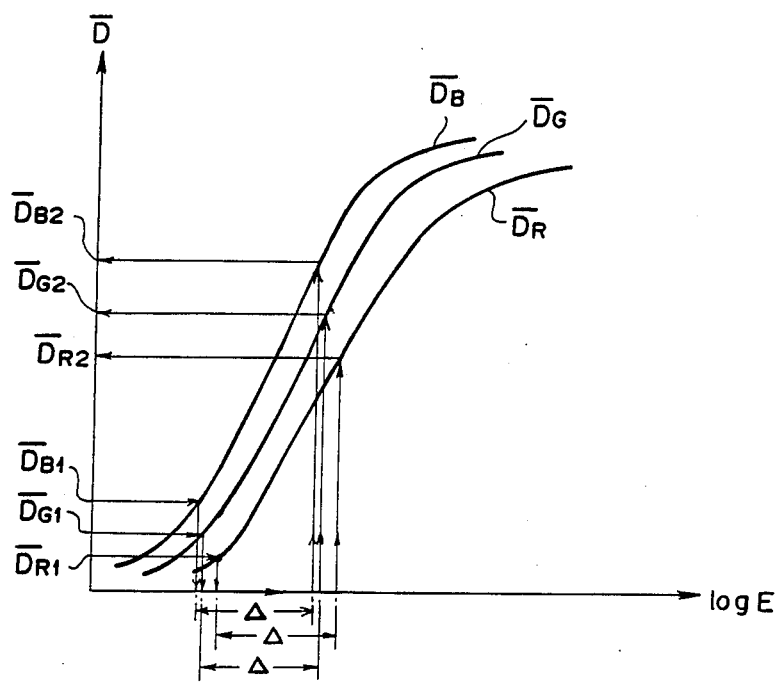
FIG. 12 is a graph showing examples of characteristic curves with respect to DME's, which curves are created from the DME's $\overline{DR}$, $\overline{DG}$, and $\overline{DB}$ of the same-color samples.

FIG. 12 is a graph showing examples of characteristic curves with respect to DME's, which curves are created from the DME's $\overline{DR}, \overline{DG},$ and $\overline{DB}$ of the same-color samples formed on the same-color sample sheet 90. In FIG. 12, the logarithmic values log E of the exposures are plotted on the horizontal axis, and the DME's $\overline{DR}, \overline{DG},$ and $\overline{DB}$ are plotted on the vertical axis.

FIG. 13 is a schematic view showing an example of an underexposed image.

The incorrectly exposed image shown in FIG. 13 was recorded on film 30 which has the same characteristics as the film 30 used to prepare the monochromatic sample sheets 31, 32, and 33 and the standard color sample sheets 40, 40, . . . .

How much the exposure of the incorrectly exposed image differs from the correct exposure may be determined in various manners. For example, for this purpose, the large area transmittance density (LATD) of all or a large part of the incorrectly exposed image may be determined. In this embodiment, it is assumed that the exposure of the incorrectly exposed image is lower by $\Delta$ along the log E axis than the correct exposure.

For each of the picture elements of the incorrectly exposed image shown in FIG. 13, three-color separation densities DR, DG, and DB are determined with the scanner 60 which was used to determine the three-color separation densities DR, DG, and DB of the standard color samples formed on the standard color sample sheets 40, 40, . . . and of the same-color samples formed on the same-color sample sheet 90. Thereafter, the aforesaid conversion table is used to convert the determined three-color separation densities DR, DG, and DB of each of the picture elements of the incorrectly exposed image shown in FIG. 13 into DME's $\overline{DR}, \overline{DG},$ and $\overline{DB}$. The DME's $\overline{DR}, \overline{DG},$ and $\overline{DB}$ corresponding to each of the picture elements of the incorrectly exposed image shown in FIG. 13 will hereinbelow be referred to as the DME's $\overline{DR1}, \overline{DG1},$ and $\overline{DB1}$.

Thereafter, the characteristic curves with respect to the DME's, which curves are shown in FIG. 12, are used to convert the DME's $\overline{DR1},$ and $\overline{DG1},$ and $\overline{DB1}$ into the DME's $\overline{DR2}, \overline{DG2},$ and $\overline{DB2}$, which correspond to a correctly exposed image. Specifically, in FIG. 12, from the position of $\overline{DR1}$ plotted on the vertical axis, a straight line is drawn parallel to the horizontal axis. An intersection of the straight line, which is drawn from the position of $\overline{DR1}$, and the characteristic curve with respect to the DME's $\overline{DR}$ is found. A perpendicular is dropped from the intersection to the horizontal axis. The position of the foot of the perpendicular is shifted a distance equal to $\Delta$, the amount by which the exposure of the incorrectly exposed image was lower than the correct exposure, rightwardly along the log E axis. A point is found on the characteristic curve with respect to the DME's $\overline{DR}$, which point corresponds to the position found on the log E axis from the shifting of the position of the foot of the perpendicular. In this manner, the DME $\overline{DR2}$, which corresponds to the correctly exposed image, is found. Also, in the same manner, from the positions of $\overline{DG1}$ and $\overline{DB1}$ plotted on the vertical axis, straight lines are drawn parallel to the horizontal axis. Intersections of the straight lines, which are drawn from the positions of $\overline{DG1}$ and $\overline{DB1}$, and the characteristic curves with respect to the DME's $\overline{DG}$ and $\overline{DB}$, respectively, are found. Perpendiculars are dropped from the intersections to the horizontal axis. The positions of the feet of the perpendiculars are shifted a distance equal to $\Delta$, the amount by which the exposure of the incorrectly exposed image was lower than the correct exposure, rightwardly along the log E axis. Points are found on the characteristic curves with respect to the DME's $\overline{DG}$ and $\overline{DB}$, which points correspond to the positions found on the log E axis from the shifting of the positions of the feet of the perpendiculars. In this manner, the DME's $\overline{DG2}$ and $\overline{DB2}$, which correspond to the correctly exposed image, are found.

Also, the relationship between the amount of light in the laser beams 13, 14, and 15 (shown in FIG. 9), which were irradiated to the monochromatic sample sheets 31, 32, and 33, and the DME's $\overline{DR}, \overline{DG},$ and $\overline{DB}$, which have been determined with the densitometer 50 (shown in FIG. 8) from the monochromatic sample sheets 31, 32, and 33, is already known.

Therefore, after the DME's $\overline{DR2}, \overline{DG2},$ and $\overline{DB2}$, which correspond to the correctly exposed image, are determined for the respective picture elements of the underexposed image shown in FIG. 13 in the manner described above, a sheet of film 30 which has the same characteristics as the film 30 used to prepare the monochromatic sample sheets 31, 32, and 33 and the like is used as the photosensitive material 22 in the printer shown in FIG. 5. The intensities of the laser beams 13, 14, and 15 are modulated by the AOM's 16, 17, and 18 so that the DME's $\overline{DR2}, \overline{DG2}$ and $\overline{DB2}$, which correspond to the correctly exposed image, are formed on the film 30. In this manner, an image is reproduced on the film 30. Accordingly, an image which has approximately the same good image quality as a correctly exposed image can be reproduced.

The incorrectly exposed image shown in FIG. 13 is an underexposed image. For an overexposed image, densities can be corrected in the same manner as that described above.

After a correctly exposed image has been reproduced on the film 30 in the manner described above, the image may be reproduced on a second photosensitive material, such as photographic paper, which has different characteristics from the film 30. For this purpose, a conventional printing apparatus may be used. Alternatively, an image corresponding to the correctly exposed image may be reproduced directly on photographic paper (i.e. the second photosensitive material) with the printer shown in FIG. 5.

In the course of reproducing a correctly exposed image directly on photographic paper, the same printer (shown in FIG. 5) that was used for the film 30 or a printer having the same characteristics as said printer need not necessarily be used. A printer differing in characteristics from the printer used for the film 30 may be used. For example, a printer which produces laser beams having wavelengths different from those of the laser beams 13, 14, and 15 shown in FIG. 5 may be used. However, for the sake of simplicity, the same printer that was used for the film 30 will be used for the photographic paper.

Figure 14:
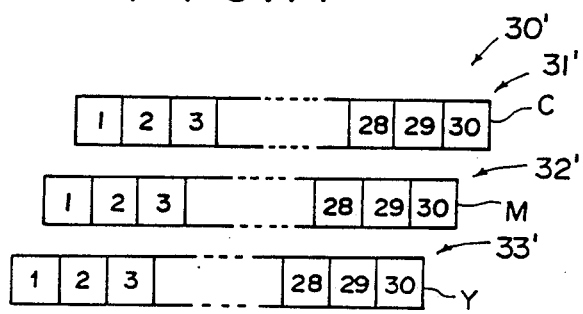
FIG. 14 is a schematic view showing examples of second monochromatic samples prepared with photographic paper.
Figure 15:
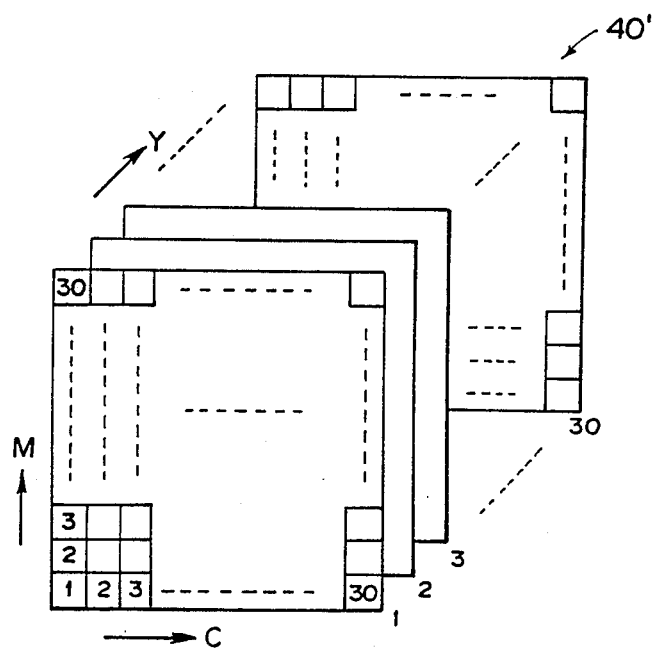
FIG. 15 is a schematic view showing examples of second standard color samples prepared with photographic paper.

FIG. 14 is a schematic view showing examples of second monochromatic samples which are formed on second monochromatic sample sheets 31', 32', and 33' and which are prepared with photographic paper. FIG. 15 is a schematic view showing examples of second standard color samples which are formed on second standard color sample sheets 40', 40', . . . and which are prepared with photographic paper. The second monochromatic samples and the second standard color samples are prepared in the same manner as the monochromatic samples on the monochromatic sample sheets 31, 32, and 33 shown in FIG. 6 and the standard color samples on the standard color sample sheets 40, 40, . . . shown in FIG. 7, except that sheets of photographic paper 30' are used instead of the film 30. For the second monochromatic sample sheets 31', 32', and 33' and the second standard color sample sheets 40', 40', . . . , thirty exposure levels are set. However, this is a mere example, and the number of exposure levels need not necessarily be equal to the number of exposure levels used for the monochromatic sample sheets 31, 32, and 33 and the standard color sample sheets 40, 40, . . . .

Figure 16:
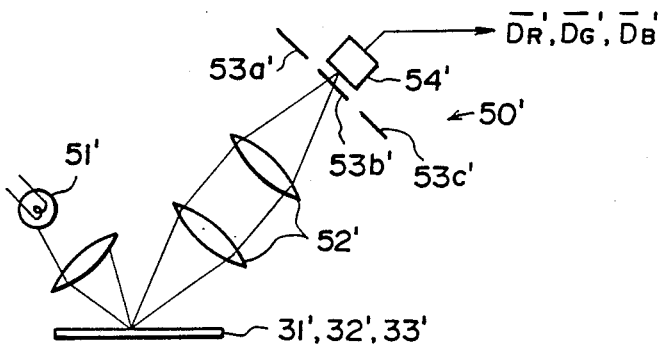
FIG. 16 is a schematic view showing an example of a reflection densitometer used to determine the R, G, and B reflection densities (i.e. second DME's $\overline{DR'}$, $\overline{DG'}$, and $\overline{DB'}$) of the second monochromatic samples shown in FIG. 14.
Figure 17:
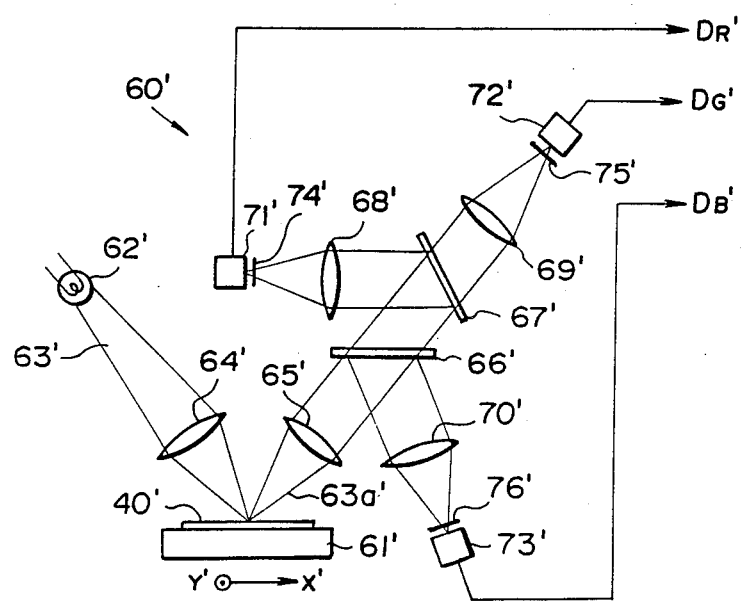
FIG. 17 is a schematic view showing an example of a reflection type scanner used to determine the reflection densities (i.e. second three-color separation densities DR', DG', and DB') of the second standard color samples shown in FIG. 15.

FIG. 16 is a schematic view showing an example of a reflection densitometer 50' used to determine R, G, and B reflection densities (i.e. second DME's $\overline{DR'}$, $\overline{DG'}$, and $\overline{DB'}$) of the second monochromatic samples which are formed on the second monochromatic sample sheets 31', 32', and 33' shown in FIG. 14. FIG. 17 is a schematic view showing an example of a reflection type scanner 60' used to determine reflection densities (i.e. second three-color separation densities DR', DG', and DB') of the second standard color samples which are formed on the second standard color sample sheets 40', 40', . . . shown in FIG. 15.

Elements constituting the reflection densitometer 50' shown in FIG. 16 are basically equivalent to those constituting the densitometer 50 shown in FIG. 8 and are therefore numbered with corresponding primed reference numerals in FIG. 16. Also, elements constituting the reflection type scanner 60' shown in FIG. 17 are basically equivalent to those constituting the scanner 60 shown in FIG. 9 and are therefore numbered with corresponding primed reference numerals in FIG. 17.

The spectral transmittance characteristics of the color filters 53a', 53b', and 53c' shown in FIG. 16 need not necessarily be identical with those of the color filters 53a, 53b, and 53c shown in FIG. 8. Also, the spectral sensitivity distribution of the photodetector 54' shown in FIG. 16 need not necessarily be identical with the spectral sensitivity distribution of the photodetector 54 shown in FIG. 8. The characteristics of dichroic mirrors 66' and 67', the color filters 74', 75', and 76', and the photodetectors 71', 72', and 73' shown in FIG. 17 need not necessarily be identical with those of the corresponding elements shown in FIG. 9.

In the same manner as the conversion table for the film 30, which was created on the basis of the densities determined with the reflection densitometer 50' and the reflection type scanner 60', a second conversion table is created for the photographic paper 30 , which table assigns coordinates (DR', DG', DB') in a second three-color separation density space to coordinates ($\overline{DR'}$, $\overline{DG'}$, $\overline{DB'}$) in a second space of DME.

Thereafter, as in the case of the the film 30, second characteristic curves for the photographic paper 30' are created with respect to the DME's in the manner described below.

Figure 18:
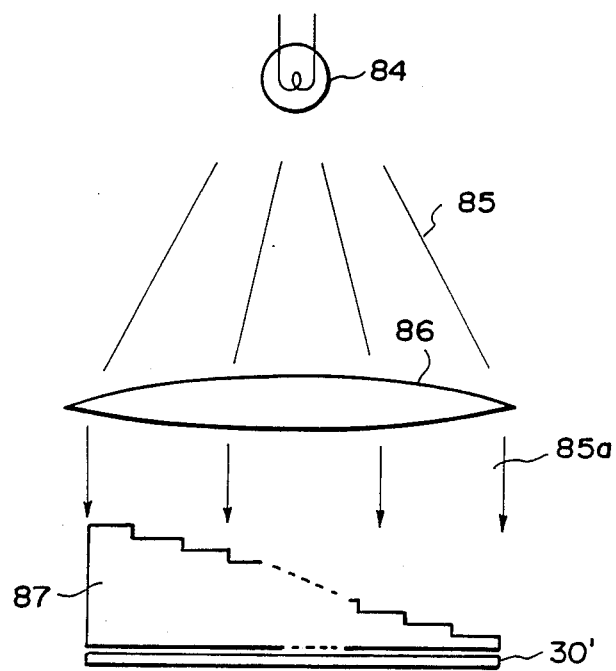
FIG. 18 is a schematic view showing an example of an exposure device used to expose photographic paper in a step-wise fashion.

FIG. 18 is a schematic view showing an example of an exposure device used to expose the photographic paper 30' in a step-wise fashion.

With reference to FIG. 18, white light 85 produced by a light source 84 is collimated by a lens system 86 and impinges upon the step wedge 87. The white light 85 which has passed through the step wedge 87 impinges upon the photographic paper 30'. The step wedge 87 is constituted of optical glass having uniform spectral transmittance, the thickness of which optical glass is changed in steps. The amount of the white light 85 impinging upon the photographic paper 30' varies in a step-wise fashion in accordance with the thicknesses of the step-like parts of the step wedge 87.

Figure 19:
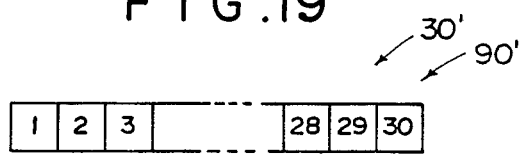
FIG. 19 is a schematic view showing examples of second same-color samples prepared with photographic paper while the exposure was changed to various values in the exposure device of FIG. 18.

FIG. 19 is a schematic view showing examples of second same-color samples which are formed on a second same-color sample sheet 90 prepared with the photographic paper 30' and whose exposures were varied by the exposure device of FIG. 18.

With reference to FIG. 19, the exposure of the second same-color sample sheet 90' has been changed in a step-wise fashion, and the numerals 1 to 30 in the square frames indicate various exposures. A larger numeral indicates a higher gray density. In this embodiment, there are 30 exposure levels. However, this is a mere example, and the number of exposure levels may be set arbitrarily in accordance with the desired accuracy or the like.

Second three-color separation densities DR', DG', and DB' of the second same-color samples thus formed on the second same-color sample sheet 90' are determined with the scanner 60' (shown in FIG. 17) which was used to determine the second three-color separation densities DR', DG', and DB' of the second standard color samples formed on the second standard color sample sheets 40', 40', . . . . Thereafter, the second conversion table is used to convert the second three-color separation densities DR', DG', and DB' of the second same-color samples formed on the second same-color sample sheet 90' into second DME's $\overline{DR'}$, $\overline{DG'}$, and $\overline{DB'}$.

Figure 20:
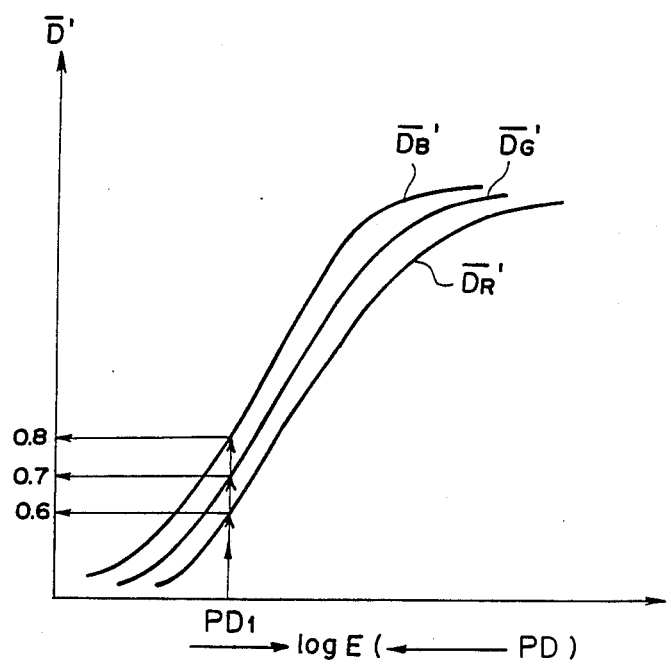
FIG. 20 is a graph showing examples of second characteristic curves with respect to DME's, which curves are created from the second DME's $\overline{DR'}$, $\overline{DG'}$, and $\overline{DB'}$ of the second same-color samples.

FIG. 20 is a graph showing examples of second characteristic curves with respect to the DME's, which was created from the second DME's $\overline{DR'}$, $\overline{DG'}$, and $\overline{DB'}$ of the second same-color samples prepared on the second standard color sample sheet 90' in the manner described above. In FIG. 20, the logarithmic values log E of the exposures are plotted on the horizontal axis, and the second DME's $\overline{DR'}$, $\overline{DG'}$, and $\overline{DB'}$ are plotted on the vertical axis.

As described above, preparations are made for the photographic paper 30' in the same manner as that for the film 30. Also, the procedure described below is followed in order for the film 30 to become associated with the photographic paper 30'.

Specifically, a spectroscope (not shown) is used in order to find spectral transmittance distributions T(λ), where λ represents the wavelength of light, of a plurality (27,000) of standard color samples which were formed on the standard color sample sheets 40, 40, ... prepared with the film 30 as shown in FIG. 7. Also, a spectral intensity distribution P(λ) of the white light 85, which was used in the exposure device shown in FIG. 18 when the second same-color samples were prepared on the second same-color sample sheet 90', is found. Thereafter, printing densities PDi (where i=B, G, R) are calculated from the formula $$PDi = -\log \frac{\int P(\lambda)Si(\lambda)T(\lambda)d\lambda}{\int P(\lambda)Si(\lambda)d\lambda}$$

$$(i = B,G,R)$$

with the spectral sensitivity distribution Si(λ) (where i=B, G, R) of the photographic paper 30' being taken into consideration. Also, the standard color samples which were formed on the standard color sample sheets 40, 40, ... prepared with the film 30 are associated with the DME's $\overline{DR}$, $\overline{DG}$, and $\overline{DB}$ of the film 30 by the aforesaid conversion table. Therefore, a third conversion table can be created which assigns the DME's $\overline{DR}$, $\overline{DG}$, and $\overline{DB}$ of the film 30 to the printing densities PDi.

In cases where it is assumed that a sheet of film 30, on which an image has been recorded, is located in the exposure device shown in FIG. 18 in lieu of the step wedge 87, the printing densities PDi correspond to the amount of light which impinges upon the photographic paper 30' after it has passed through the film 30. (Hereinafter, "i" will be omitted from "PDi".) Therefore, the printing densities PD correspond to the horizontal axis (i.e. the log E axis) of the graph shown in FIG. 20. However, the value of log E increases rightwardly along the horizontal axis of the graph shown in FIG. 2, whereas the value of PD increases leftwardly along the horizontal axis. Also, a certain value of log E does not absolutely correspond to a specific value of PD. For example, it cannot be defined definitely which value of PD corresponds to log E=1.0. However, a certain range of log E values coincide with the same range of PD values. For example, a log E width of 0.5 (i.e. log E1 - log E2=0.5) along the horizontal axis coincides with a PD width of 0.5 (i.e. PD1 - PD2=0.5) along the horizontal axis.

In FIG. 20, log E and PD have the aforesaid relationship. Therefore, unless a certain value of log E absolutely corresponds to a specific value of PD, when values of PD are plotted on the horizontal axis in FIG. 20, positions of the second characteristic curves with respect to the DME's $\overline{DR'}$, $\overline{DG'}$, and $\overline{DB'}$ along the horizontal axis are not determined definitely. However, the positions of the second characteristic curves with respect to the DME's $\overline{DR'}$, $\overline{DG'}$, and $\overline{DB'}$ along the horizontal axis may be set arbitrarily. This is because, when a sheet of film 30, on which an image has been recorded, is located in the exposure device shown in FIG. 18 in lieu of the step wedge 87, the color temperature of the white light 85 and the types of color filters (not shown in FIG. 18) used in combination with the white light 85 determine the color balance of the image (for example, a slightly bluish image, or a slightly reddish image) reproduced on the photographic paper 30'. Also, the intensity of the white light 85 and the exposure time can be selected arbitrarily. In this embodiment, the positions of the second characteristic curves with respect to the DME's $\overline{DR'}$, $\overline{DG'}$, and $\overline{DB'}$ along the horizontal axis are determined in the manner described below.

Specifically, with the configuration shown in FIG. 10, a correctly exposed image of the gray screen 82 having a reflectivity of 18% is recorded on a sheet of film 30. The correctly exposed image is then developed. Thereafter, in the exposure device shown in FIG. 18, the film 30 on which the correctly exposed image of the gray screen 82 has been recorded is located in lieu of the step wedge 87, and the correctly exposed image is printed on a sheet of photographic paper 30'. During the printing operation, the color temperature and the intensity of the white light 85, the exposure time, and the like, are set to standard values which are generally used in printing apparatuses. The photographic paper 30' is then subjected to development processing. Thereafter, second three-color separation densities DR', DG', and DB' of the correctly exposed image of the gray screen 82 having a reflectivity of 18%, which image has been printed on the photographic paper 30', are determined with the reflection type scanner 60' shown in FIG. 17. The aforesaid second conversion table is used to convert the second three-color separation densities DR', DG', and DB' into second DME's $\overline{DR'}$, $\overline{DG'}$, and $\overline{DB'}$. Thereafter, a second standard color sample, which corresponds to the second DME's $\overline{DR'}$, $\overline{DG'}$, and $\overline{DB'}$, is selected from the second standard color sample sheets 40', 40', .... (If necessary, interpolation is carried out for this purpose.) Printing densities PD corresponding to the selected second standard color sample sheet 40' are found. (The found printing densities PD will hereinafter be referred to as PD1.) On the graph shown in FIG. 20, the positions of the second characteristic curves with respect to the DME's $\overline{DR'}$, $\overline{DG'}$, and $\overline{DB'}$ along the horizontal axis are determined so that the second DME's $\overline{DR'}$, $\overline{DG'}$, and $\overline{DB'}$ corresponding to PD1 are respectively equal to 0.6, 0.7, and 0.8 (these values are mere design choices).

After the positions of the second characteristic curves with respect to the DME's $\overline{DR'}$, $\overline{DG'}$, and $\overline{DB'}$ are determined along the horizontal axis of the graph shown in FIG. 20, second DME's $\overline{DR'}$, $\overline{DG'}$, and $\overline{DB'}$, with which an image is to be reproduced on a sheet of photographic paper 30', are determined from the DME's $\overline{DR2}$, $\overline{DG2}$, and $\overline{DB2}$ which correspond to the correctly exposed image and with which an image is to be reproduced on the film 30. Specifically, the third conversion table is used to convert the DME's $\overline{DR2}$, $\overline{DG2}$, and $\overline{DB2}$, which correspond to the correctly exposed image, into printing densities PD. Thereafter, the characteristic curves shown in FIG. 20 are used to determine the second DME's $\overline{DR'}$, $\overline{DG'}$, and $\overline{DB'}$ with which an image is to be reproduced on a sheet of photographic paper 30'.

Also, the relationship between the amount of light in the laser beams 13, 14, and 15 (shown in FIG. 9) which were irradiated to the second monochromatic sample sheets 31', 32', and 33', and the second DME's $\overline{DR'}$, $\overline{DG'}$, and $\overline{DB'}$, which have been determined with the reflection densitometer 50' (shown in FIG. 16) from the second monochromatic sample sheets 31', 32', and 33', is already known.

Therefore, after the second DME's $\overline{DR'}$, $\overline{DG'}$, and $\overline{DB'}$, which correspond to the correctly exposed image, are determined in the manner described above, a sheet of photographic paper 30' is used as the photosensitive material 22 in the printer shown in FIG. 5. The intensities of the laser beams 13, 14, and 15 are modulated by the AOM's 16, 17, and 18 so that the second DME's $\overline{DR'}$, $\overline{DG'}$, and $\overline{DB'}$ which correspond to the correctly exposed image are formed on the film 30. In this manner, an image is reproduced on the photographic paper 30'. Accordingly, an image which has approximately the same good image quality as a correctly exposed image can be reproduced on the photographic paper 30'.

In the embodiment described first, in cases where a negative image recorded on a sheet of color negative film 30 was incorrectly exposed, an image corresponding to a correctly exposed image is reproduced on a sheet of color negative film 30. In the embodiment described next, in cases where a negative image recorded on a sheet of color negative film 30 was incorrectly exposed, an image corresponding to a correctly exposed image is reproduced on a sheet of photographic paper 30'. However, the method for reproducing a correctly exposed image from an incorrectly exposed image in accordance with the present invention is also applicable in cases where various other color photosensitive materials and various other second photosensitive materials are employed. For example, reversal film may be used in lieu of the color negative film 30, and reversal paper on which an image is printed from reversal film may be used in lieu of the photographic paper 30'. Alternatively, instant film may be used in lieu of the color negative film 30. The densities described in the aforesaid embodiments are altered to reflection densities and transmission densities in accordance with the types of photosensitive materials used.

We claim:

1. A method for reproducing a correctly exposed image from an incorrectly exposed image, which comprises the steps of:
   (i) creating a conversion table, which assigns coordinates in a three-color separation density space to coordinates in a space of DME, from an operation wherein:
      (a) each of monochromatic light beams corresponding to hues, which will be formed in a color photosensitive material, is irradiated to said color photosensitive material, and the amount of light in each said monochromatic light beam irradiated to said color photosensitive material is changed to various values, whereby monochromatic samples, in which a dye corresponding to one of the hues has formed a color with various levels of densities, are prepared for each of the hues,
      (b) DME's of said monochromatic samples are determined,
      (c) said monochromatic light beams are simultaneously irradiated to a photosensitive material which has the same characteristics as said color photosensitive material, and the amount of light in said monochromatic light beams irradiated to said photosensitive material is changed to various values, thereby to prepare a plurality of standard color samples in which the dyes corresponding to the hues have formed colors with various levels of densities, and
      (d) three-color separation densities of said standard color samples are determined,
   (ii) creating characteristic curves of said color photosensitive material with respect to the DME's from an operation wherein:
      (e) light having the same spectral intensity distribution is irradiated to a photosensitive material which has the same characteristics as said color photosensitive material, and the exposure is changed to various values in order to prepare a plurality of same-color samples,
      (f) three-color separation densities of said same-color samples are determined, and
      (g) said conversion table is used in order to convert the determined three-color separation densities into DME's,
   (iii) determining three-color separation densities of respective picture elements of an image which has been recorded on a photosensitive material which has the same characteristics as said color photosensitive material,
   (iv) using said conversion table in order to convert the determined three-color separation densities of the respective picture elements into DME's,
   (v) in cases where said image is an incorrectly exposed image resulting from an under-exposure or an over-exposure, using said characteristic curves in order to convert the DME's corresponding to the respective picture elements into DME's which will correspond to a correctly exposed image, and
   (vi) reproducing an image on the basis of the DME's which correspond to the correctly exposed image and which are thus found for the respective picture elements.

2. A method as defined in claim 1 wherein the image is reproduced on the basis of the DME's, which correspond to a correctly exposed image, on a photosensitive material which has the same characteristics as said color photosensitive material.

3. A method as defined in claim 1 wherein said monochromatic light beams are also used in order to reproduce the image on the basis of the DME's, which correspond to a correctly exposed image.

4. A method as defined in claim 1, 2, or 3 wherein said monochromatic light beams are laser beams.

5. A method as defined in claim 1 wherein:
   (1) a second conversion table, which assigns coordinates in a second three-color separation density space to coordinates in a second space of DME, is created from an operation wherein:
      (A) each of second monochromatic light beams corresponding to hues, which will be formed in a second photosensitive material on which an image is to be reproduced from the image recorded on said photosensitive material having the same characteristics as said color photosensitive material, is irradiated to a photosensitive material having the same characteristics as said second photosensitive material, and the amount of light in each said second monochromatic light beam irradiated to said photosensitive material having the same characteristics as s id second photosensitive material is changed to various values, whereby second monochromatic samples, in which a dye corresponding to one of the hues, which will be formed in said second photosensitive material, has formed a color with various levels of densities, are prepared for each of the hues, which will be formed in said second photosensitive material, (B) second DME's of said second monochromatic samples are determined, (C) said second monochromatic light beams are simultaneously irradiated to a photosensitive material which has the same characteristics as said second photosensitive material, and the amount of light in said second monochromatic light beams irradiated to said photosensitive material which has the same characteristics as said second photosensitive material is changed to various values, thereby to prepare a plurality of second standard color samples in which the dyes corresponding to the hues, which will be formed in said second photosensitive material, have formed colors with various levels of densities, and (D) second three-color separation densities of said second standard color samples are determined, (2) second characteristic curves of said second photosensitive material with respect to the DME's are created from an operation wherein:

(E) second light having the same spectral intensity distribution is irradiated to a photosensitive material which has the same characteristics as said second photosensitive material, and the exposure is changed to various values in order to prepare a plurality of second same-color samples, (F) second three-color separation densities of said second same-color samples are determined, and (G) said second conversion table is used in order to convert the second three-color separation densities into second DME's, (3) a third conversion table, which assigns said DME's of said monochromatic samples prepared with said color photosensitive material to printing densities, is created from an operation wherein:

(H) spectral distributions of a plurality of said standard color samples prepared with said photosensitive material, which has the same characteristics as said color photosensitive material, are found, and (I) for each of a plurality of said standard color samples prepared with said photosensitive material, which has the same characteristics as said color photosensitive material, printing densities Di are calculated from the formula $$Di = -\log \frac{\int P(\lambda)Si(\lambda)T(\lambda)d\lambda}{\int P(\lambda)Si(\lambda)d\lambda}$$

$$(i = B, G, R)$$

wherein $T(\lambda)$ represents the spectral distribution of each of said standard color samples, $P(\lambda)$ represents the spectral intensity distribution of said second light, $Si(\lambda)$ represents the spectral sensitivity distribution of said second photosensitive material, and $\lambda$ represents the wavelength of the light, (4) after the DME's which will correspond to the correctly exposed image are found for the respective picture elements, said third conversion table is used to convert said DME's of the respective picture elements into the printing densities of the respective picture elements, (5) said second characteristic curves with respect to the DME's are used to find the second DME's of the respective picture elements from said printing densities of the respective picture elements, and (6) said second monochromatic light beams are irradiated to positions on said second photosensitive material corresponding to the respective picture elements so that the amount of light in said second monochromatic light beams corresponds to the thus found second DME's of the respective picture elements, whereby the image is reproduced on said second photosensitive material.

6. A method as defined in claim 5 wherein said second monochromatic light beams are laser beams.

* * * * *